United States Patent Office 3,597,353
Patented Aug. 3, 1971

3,597,353
4,5,6,7-TETRAHYDRO-BENZOTRIAZOLE AS METAL DEACTIVATOR
Donald Richard Randell, Stockport, Ernest Alfred Cox, Davyhulme, Urmston, and Alan Atkinson, Eaton, near Congleton, England, assignors to Geigy Chemical Corporation, Ardsley, N.Y.
No Drawing. Filed July 16, 1968, Ser. No. 745,116
Claims priority, application Great Britain, July 21, 1967, 33,535/67
Int. Cl. C08f 45/70; C10m 1/32
U.S. Cl. 252—50                                    17 Claims

ABSTRACT OF THE DISCLOSURE

The production of 4,5,6,7-tetrahydro-benzotriazole from benzotriazole by catalytic hydrogenation and the use of the tetrahydrobenzotriazole as corrosion-inhibiting agent in novel compositions containing the same in mixture with functional materials, especially mineral oil, and varnishes and lacquers based on white spirits, are described.

---

The present invention concerns a corrosion inhibitor for the protection of metallic surfaces, particularly copper surfaces, when in contact with functional fluids.

The use of triazole compounds, and benzotriazole in particular, as copper deactivators is very well-known. Thus benzotriazole has found wide application as a copper deactivator in such systems as, for instance, anti-freeze solutions, synthetic ester lubricants for jet aircraft, wax polishes, wrapping material for protecting copper articles and so forth.

Hitherto, however, it has not been possible to employ benzotriazole satisfactorily in such functional fluids which are based on mineral oils.

In contrast thereto, it has now been found that 4,5,6,7-tetrahydrobenzotriazole when used as metal deactivator in inhibiting corrosion of metallic surfaces, especially copper surfaces, very satisfactory results are achieved which are very superior to those obtained when using benzotriazole for the same purpose.

In the past, 4,5,6,7-tetrahydrobenzotriazole has been obtained only in low yields by alkaline hydrolyzation, in the cold, of 1-carbobenzyloxy-7a-N-morpholino-3a,4,5,6-7,7a-hexahydrobenzotriazole, in contrast to 4,5,6,7-tetrahydrocyclohepta(d)-1,2,3-triazole which has been obtained in good yields by catalytic hydrogenation of the corresponding 1-carbobenzyloxy-7α-N-morpholino analog, using palladium on carbon catalysts.

The present invention provides, as a first aspect, a process of producing 4,5,6,7-tetrahydrobenzotriazole which comprises contacting benzotriazole or N-hydroxybenzotriazole with molecular hydrogen in the presence of a metal hydrogenation catalyst, which surprisingly affords the tetrahydrobenzotriazole in excellent yields.

The hydrogenation is carried out by contacting the benzotriazole compound with molecular hydrogen in the presence of a metal hydrogenation catalyst. The dehydrogenation is conveniently effected by agitating vigorously a mixture of the benzotriazole compound and the catalyst in a sealed reactor which is charged with an amount of hydrogen greater than the stoichiometric proportion required for the hydrogenation of the aromatic ring of the benzotriazole compound.

The hydrogenation may be effected, for instance, in an autoclave, or other sealed reactor equipped with an efficient stirring or alternative agitating device.

Advantageously, the reaction is performed by first dissolving the benzotriazole compound in a solvent which is inert under the conditions of the reaction before being contacted with molecular hydrogen. Suitable solvents include, for example, methanol and ethanol.

The reaction may be carried out at any temperature within the range of from 25° C. to 200° C., but it is preferred, however, to conduct the hydrogenation at a temperature within the range of from 50° to 150° C.

While the hydrogenation may, if desired, be conducted at atmospheric pressure, it is advantageous in terms of reaction velocity to effect the hydrogenation at a superatmospheric pressure, for instance at a pressure within the range of from 50 to 250 atmospheres, more preferably within the range of from 100 to 200 atmospheres. In a preferred embodiment of the process of this invention therefore, the molecular hydrogen is charged into the reactor at a superatmospheric pressure and the reaction is continued until the pressure in the reactor ceases to drop and remains steady, indicating that hydrogenation of the benzotriazole compound is complete.

The benzotriazole compound is preferably subjected to a pre-treatment before hydrogenation in order to remove therefrom any sulphur or other hydrogenation catalyst poisons. This pre-treatment of the starting-material may be carried out, for instance, by agitating a solution of the benzotriazole compound in the same inert solvent which may be used in the subsequent hydrogenation reaction in the presence of a desulphurisation or a hydrogenation catalyst.

The desulphurisation or hydrogenation catalyst used in the pre-treatment of the benzotriazole compound may be a platinum group metal catalyst, such as platinum, palladium or rhodium, or other transition metal catalyst, for example, iron, nickel, cobalt or zinc. If desired, the catalyst may be supported on a carrier, for example, silica, alumina, asbestos, calcium carbonate, carbon, pumice of fuller's earth.

If necessary, the pre-treatment may be repeated one or more times until the desulphurisation or hydrogenation catalyst is observed to retain its activity, thus indicating that all the catalyst poisons have been removed. At the completion of the pre-treatment, the purified starting-material may be isolated, for instance, by filtering off the desulphurisation or hydrogenation catalyst. The filtrate, consisting of purified starting-material dissolved in an inert solvent, may then be used in the hydrogenation process of this invention.

The hydrogenation of the benzotriazole compound is preferably effected using a rhodium catalyst either alone or in admixture with other conventional metal hydrogenation catalysts, for instance nickel, palladium or platinum. However, other metal hydrogenation catalysts especially platinum group metal catalysts such as platinum or palladium may be employed as an alternative to rhodium or mixtures comprising rhodium if desired. The catalyst used is conveniently supported on any of a variety of conventional carriers, for instance, silica, alumina, asbestos, calcium carbonate, charcoal or pumice; most preferably, however, the hydrogenation catalyst is rhodium supported on carbon. If a supported catalyst is employed, the proportion of the platinum group metal catalyst in the supported catalyst is advantageously within the range of from 1% to 10% by weight based on the total weight of the supported catalyst.

The 4,5,6,7-tetra-hydrobenzotriazole has valuable corrosion-inhibiting, tarnish-inhibiting or other preservative properties when applied to metal surfaces. It may be used as a metal corrosion or tarnish inhibitor in a wide variety of functional materials susceptible to deterioration of function. The deterioration of functional materials in contact with metal surfaces may be due to corrosive action of the material on the metal surface and subsequent oxidative breakdown of the material activated by the dissolved metal ions. The 4,5,6,7-tetra-hydrobenzotriazole may therefore be used in such functional materials as a metal-protective ingredient to inhibit such deterioration.

The present invention therefore provides as a second aspect, a composition comprising a functional material susceptible to deterioration of function when in contact with a metal, which comprises as metal deactivator, 4,5,6,7-tetrahydro-benzotriazole.

Examples of functional materials into which the 4,5,6,7-tetrahydro-benzotriazole compounds may be incorporated include natural and synthetic lubricants, hydraulic fluids, varnishes, wax polishes and polymeric substances such as rubber, polypropylene, polyvinyl chloride and acrylonitrile/butadiene/styrene terpolymer; and aqueous media, for instance aqueous ethylene glycol or other glycol-containing compositions finding application as anti-freeze or other coolant mixtures, and aqueous detergent or cleaning compositions particularly such compositions comprising any, or all, of polyphosphate, a peroxy compound or a polyamino polycarboxylic acid.

The 4,5,6,7-tetrahydro-benzotriazole is thus a valuable additive for natural and synthetic lubricant compositions, for instance in compositions in which it is desired to have present an antioxidant, for example dioctyl diphenylamine, which tends to bring about corrosion of any copper or copper alloy with which it comes into contact, unless a copper inhibitor is present in the lubricant. Unexpectedly satisfactory corrosion inhibiting activity is shown by 4,5,6,7-tetrahydro-benzotriazole especially in mineral oils so that the use of this compound in such lubricants is particularly advantageous. Other applications in which 4,5,6,7-tetrahydro-benzotriazole may be employed to particular advantage because of its excellent corrosion inhibiting properties are in the field of varnishes and lacquers or the like based on white spirits. Again, the results obtained are very superior to those achieved with benzotriazole.

The 4,5,6,7-tetra-hydro-benzotriazole compound may also be employed as metal deactivator to inhibit degradation of polymeric structures in contact with copper. It may, for example, be advantageously incorporated into polypropylene material in tended for use as covering material for copper wire or other copper articles which materials may otherwise be susceptible to rapid degradation in the presence of copper.

While the 4,5,6,7-tetra-hydro-benzotriazole may be used in the compositions of this invention as a metal deactivator for a wide variety of metals, for example iron, silver or cadmium or alloys containing these metals, it is particularly useful as a metal deactivator for copper or copper alloys in contact with the said functional materials.

The proportion of the 4,5,6,7-tetra-hydro-benzotriazole which is present in the composition of this invention is preferably within the range of from 0.01% to 10%, more preferably within the range of from 0.1% to 5% by weight based on the total weight of the functional material.

A further application in which the metal corrosion-inhibiting properties of the 4,5,6,7-tetra-hydro-benzotriazole may be employed is the treatment of metal surfaces in order to protect the surfaces from corrosion or tarnishing by contact with a noxious environment.

Thus, the present invention provides, as a third aspect, a method of treating a metal surface, comprising contacting the metal surface with a composition comprising an inert carrier and, as corrosion or tarnish inhibitor, 4,5,6,7-tetra-hydro-benzotriazole.

Metal surfaces may be treated with the 4,5,6,7-tetra-hydro-benzotriazole in order to preserve them against corrosion or tarnishing, by contacting the surfaces with the 4,5,6,7-tetra-hydro-benzotriazole compound in the vapour phase or by contacting the metal surface with the tetra-hydro-benzotriazole in a solution, for instance in aqueous, glycol or polyglycol solvents; the 4,5,6,7-tetra-hydro-benzotriazole compound may be applied in any conventional manner for treating metal surfaces, for example by spraying on as a solution, by immersing the metal in a solution, or by wrapping the metal in paper or other packaging material containing the said tetra-hydro-benzotriazole inhibitor. If the metal is treated with a solution of the tetra-hydro-benzotriazole, the solution preferably contains a proportion of the 4,5,6,7-tetra-hydro-benzotriazole compound within the range of from 0.01% to 10%, more preferably within the range of from 0.1% to 5% by weight based on the total weight of the solution.

Again, while the tetra-hydro-benzotriazole may be used to treat a wide range of metals or alloys, for instance iron, silver or cadmium or alloys containing these metals, which metal or alloy surfaces are susceptible to corrosion, tarnishing or other deterioration due to contact with hydrogen sulphide, ammonia or other noxious environment detrimental to the utility or appearance of the surfaces, the tetra-hydro-benzotriazole compound is particularly useful in inhibiting the corrosion or tarnishing of copper or copper alloy surfaces. Furthermore, the treatment of copper or copper alloy surfaces with the tetra-hydro-benzotriazole compound may have the effect of enabling steam or other vapours to condense thereon as droplets, and the said compound is thus valuable in improving the heat transfer properties of copper or copper alloy condensers or other articles.

The following examples further illustrate the present invention. Parts by weight shown therein bear the same relation to parts by volume as do kilograms to litres. Percentages are expressed by weight unless otherwise stated.

EXAMPLE 1

174 parts of benzotriazole of a pure grade suitable for photographic purposes were dissolved in 1,000 parts of ethanol and agitated with 10 parts of Raney nickel hydrogenation catalyst for a period of 30 minutes. This solution was then filtered to remove the catalyst and the filtrate placed in a pressure reactor fitted with an efficient stirring device and a means of recording the internal temperature. 1.0 part of a rhodium/charcoal catalyst containing 5% by weight of rhodium was also placed in the reactor. The reactor was charged with hydrogen to a pressure of 130 atmospheres and then heated to an internal temperature of 100° C., whilst the contents of the reactor were stirred vigorously.

When hydrogenation had ceased, as indicated by the pressure in the reactor ceasing to fall, the reactor was allowed to cool to 25° C. After releasing the excess hydrogen, the reaction mixture was filtered to remove the catalyst and the filtrate was evaporated to dryness.

In this way, 160 parts (89% theoretical) of a white solid were obtained. Recrystallisation of this solid from water gave 140 parts (87.5% recovery) of 4,5,6,7,-tetrahydrobenzotriazole as white crystalline needles having melting-point within the range 82° to 85° C., and having the following elemental analysis by weight.

Calculated for $C_6H_9N_3$ (percent): C, 58.52; H, 7.37; N, 34.12. Found (percent): C, 58.66; H, 7.27; N, 33.84.

EXAMPLE 2

50 parts of N-hydroxy-benzotriazole were dissolved in 1,000 parts of ethanol and agitated with 10 parts of Raney nickel hydrogenation catalyst for a period of 30 minutes. This solution, after filtration, was then hydrogenated under similar conditions to those described in Example 1.

In this way, 45 parts (99% theoretical yield) of a white solid were obtained which, on recrystallisation from water gave 4,5,6,7-tetra-hydro-benzotriazole as white crystalline needles having melting-point within the range of from 82° to 85° C.

EXAMPLE 3

A specimen of bright acid-dipped copper foil was immersed in one of the following solutions: a 0.1% weight/volume aqueous solution of benzotriazole; and a 0.1% weight/volume aqueous solution of 4,5,6,7-tetra-hydro-benzotriazole. The two immersed specimens were maintained at 65° C. for 2 minutes and they were then washed in distilled water and dried in hot air.

The dried specimens were then placed in a hot oven maintained at 140° C. and the time taken before the onset of visible tarnish took place was noted.

The results are shown in the following table. For the purposes of comparison, data is also included in the table relating to a copper specimen dipped into an aqueous solution containing no additive.

TABLE

| Example | Additive | Tarnishing time, minutes |
|---------|----------|--------------------------|
|         | None     | 10                       |
|         | Benzotriazole | 10-15               |
| 3       | Tetrahydrobenzotriazole | 30-40      |

These results demonstrate the superior tarnish resistance at elevated temperature of a copper specimen treated with a compound of this invention compared with a similar specimen treated with a conventional tarnish inhibitor.

EXAMPLE 4

Two S.A.E. 20 paraffinic-based mineral oil compositions containing 0.01% by weight (maximum solubility) of benzotriazole and 0.2% by weight of 4,5,6,7-tetra-hydro-benzotriazole respectively were made up.

Copper and steel specimens were immersed in the respective oils which were then heated to 170° C. and maintained at this temperature for 48 hours whilst air was bubbled through the hot oils at a rate of 15 litres/hour.

At the end of this time, the change in viscosity of the oils was observed, the final acid value of the oils was calculated and the loss in weight of the immersed specimens was determined.

The results obtained are summarised in the following table:

TABLE

| Example | Additive | Viscosity change, centistokes | Acid value, mg. KOH/g. | Loss in weight of specimen, milligrams | |
|---------|----------|-------------------------------|------------------------|----------------------------------------|---|
|         |          |                               |                        | Copper | Steel |
|         | Benzotriazole | 156 | 5.06 | 1.8 | 1.5 |
| 4       | Tetrahydro-benzotriazole | 118 | 4.4 | 0.8 | 0.7 |

The results in the above table show that in mineral oil media tetrahydrobenzotriazole is a much more efficient corrosion inhibitor for copper and steel than benzotriazole itself which is only slightly soluble in mineral oils.

EXAMPLE 5

The following dry powder compositions were made up:

(A)

80 parts by weight of pentasodium tripolyphosphate
20 parts by weight of sodium dodecyl benzene sulphonate.

(B)

80 parts by weight of pentasodium tripolyphosphate.
19.98 parts by weight of sodium dodecyl benzene sulphonate
0.02 part of benzotriazole.

(C)

80 parts by weight of pentasodium tripolyphosphate
19.98 parts by weight of sodium dodecyl benzene sulphonate
0.02 part of 4,5,6,7-tetra-hydro-benzotriazole.

0.5% weight/volume aqueous solutions were made up from each of compositions A, B and C and heated to 70° C. Articles of nickel silver cutlery were then immersed in each of the respective solutions and maintained in the hot solutions for a period of three hours. The appearance of each silver article was noted at regular intervals throughout this period. After 15 minutes, the articles in the solution of Composition A had tarnished to a deep yellow colour, those in the solution of Composition B to a light yellow colour, while those in the solution of Composition C were free from tarnish.

After three hours, the cutlery in solutions of Compositions A and B had developed a deep yellow to brown colour while that in the solution of Composition C showed substantially no staining.

We claim.

1. A composition comprising (a) a functional material susceptible to deterioration of function when in contact with a metal, said functional material selected from the group consisting of a natural or synthetic lubricant, hydraulic fluid, varnish based on white spirits, lacquer based on white spirits, polypropylene, polyvinyl chloride, an acrylonitrile/butadiene/styrene terpolymer, an antifreeze composition, a coolant composition, and an aqueous detergent composition, and (b) 4,5,6,7-tetrahydrobenzotriazole in a metal deactivating amount.

2. A composition as claimed in claim 1, wherein the proportion of 4,5,6,7-tetrahydro-benzotriazole compound is within the range of from 0.01% to 10% by weight based on the total weight of the functional material.

3. A composition as claimed in claim 2, wherein the functional material is a natural or synthetic lubricant containing an anti-oxidant in an oxidation-reducing amount.

4. A composition as claimed in claim 3, wherein the antioxidant is dioctyl diphenylamine.

5. A composition as claimed in claim 2, wherein the functional material is a mineral oil.

6. A composition as claimed in claim 2, wherein the functional material is a varnish or lacquer based on white spirits.

7. A composition as claimed in claim 2, wherein the functional material is polypropylene.

8. A composition as claimed in claim 1, wherein the functional material is an aqueous detergent composition.

9. A composition as claimed in claim 8, wherein the detergent composition comprises detergent amounts of an alkali metal pholyphosphate.

10. A composition as claimed in claim 1, wherein the proportion of 4,5,6,7-tetrahydro-benzotriazole is within the range of from 0.1% to 5% by weight based on the total weight of the functional material.

11. A method of treating a metal surface comprising contacting the metal surface with a composition comprising an inert carrier and a corrosion and/or tarnish inhibiting amount of 4,5,6,7-tetrahydro-benzotriazole.

12. A method as claimed in claim 11, wherein the metal surface is of copper, iron, silver, cadmium or an alloy of these metals.

13. A method as claimed in claim 12, wherein the metal surface is contacted with the 4,5,6,7-tetrahydrobenzotriazole compound in a solution, in water, glycol or polyglycol solvent.

14. A method as claimed in claim 13, wherein the solution contains a proportion of the 4,5,6,7-tetrahydrobenzotriazole compound within the range of from 0.01% to 10% by weight based on the total weight of the solution.

15. A method as claimed in claim 13, wherein the solution contains a proportion of the 4,5,6,7-tetrahydrobenzotriazole compound within the range of from 0.1% to 5% by weight based on the total weight of the solution.

16. A method as claimed in claim 12, wherein the metal surface is wrapped in paper or other packaging material containing the tetrahydro-benzotriazole compound.

17. A method as claimed in claim 11, wherein the metal surface is contacted with 4,5,6,7,-tetra-hydro-benzotriazole in the vapor phase.

References Cited
UNITED STATES PATENTS

| | | | |
|---|---|---|---|
| 2,861,078 | 11/1958 | Miller et al. | 260—308.2 |
| 3,197,475 | 7/1965 | Carboni | 260—308.2 |
| 3,413,227 | 11/1968 | Howard et al. | 252—77 |

DANIEL E. WYMAN, Primary Examiner

W. J. SHINE, Assistant Examiner

U.S. Cl. X.R.

260—45.8N; 252—77, 137, 152, 390